Figure 1:
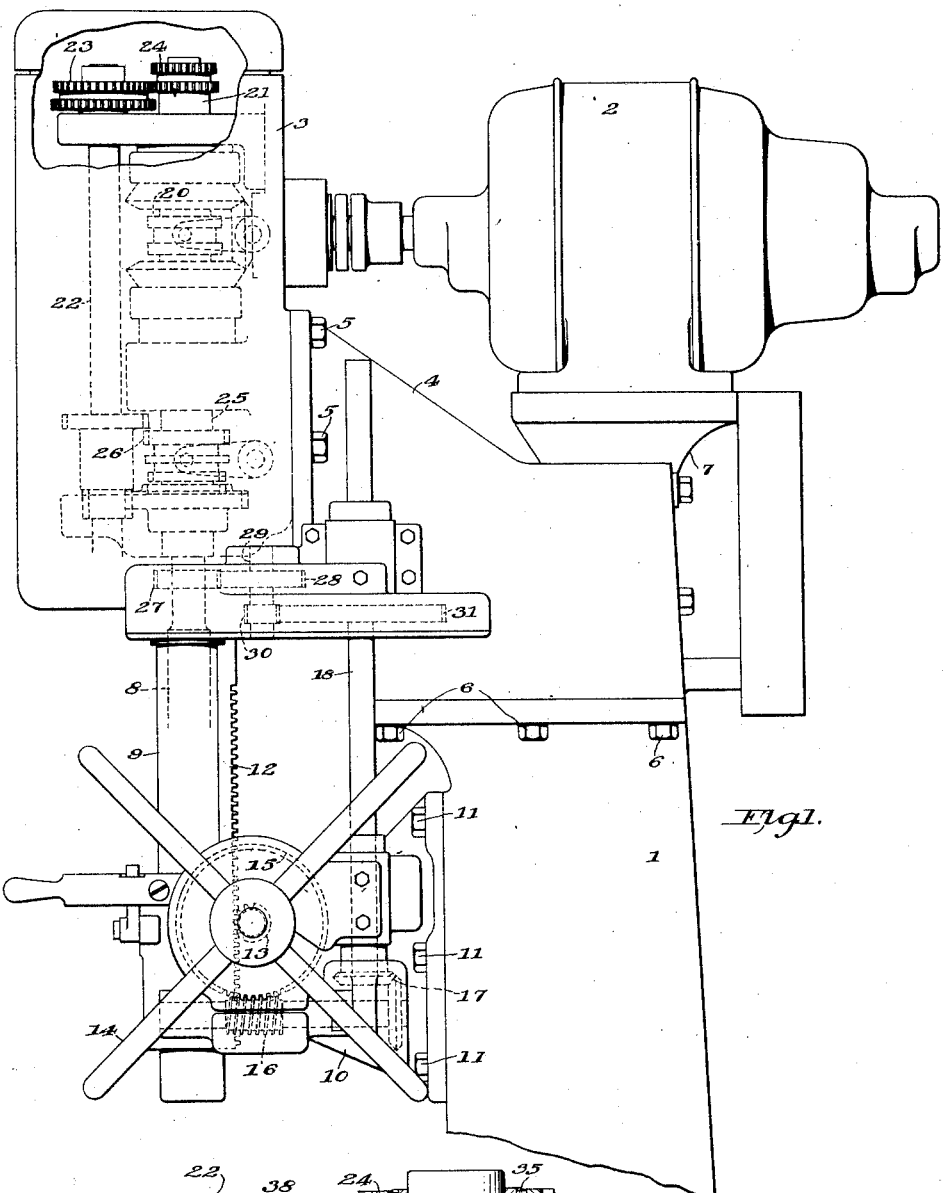

Feb. 14, 1928.

G. E. MERRYWEATHER 1,659,437

DOUBLE TAKE-OFF GEAR

Filed June 16, 1925

Inventor
George E. Merryweather
By Attorney
Albert F. Nathan

Patented Feb. 14, 1928.

1,659,437

UNITED STATES PATENT OFFICE.

GEORGE E. MERRYWEATHER, OF CLEVELAND, OHIO, ASSIGNOR TO THE CINCINNATI BICKFORD TOOL COMPANY, OF CINCINNATI, OHIO, A CORPORATION OF OHIO.

DOUBLE TAKE-OFF GEAR.

Application filed June 16, 1925. Serial No. 37,468.

My invention is concerned with a gearing system for obtaining changes in speed of a driven member and is chiefly concerned with a transposition gearing system for obtaining changes of speed in a machine tool.

In many machines as for example, in a machine tool of the upright drilling type, it is very desirable to obtain changes in speed between a driving and a driven member with a mechanism as simple in construction as possible. Thus in effecting changes in speed between a driving and a driven member by means of transposition or change gears, it is desirable to limit as much as possible the number of gears used in the mechanism.

One of the chief objects of my invention is to provide a gearing system that shall effect a maximum number of speed changes with a minimum number of parts. By reducing the number of parts to effect a given number of speed changes, the apparatus is not only simplified but the operation of effecting the speed changes is simplified. My invention also provides for a system of transposition gears in a drilling machine that shall comprise a limited number of parts for effecting a given number of speed changes.

The invention disclosed in this application involves transposition gears and is illustrated by means of an upright drilling machine. In an upright drilling machine, a source of power, which is preferably an electric motor, is connected to the drill spindle through a variable gearing system. The gearing system is varied not only to change the rate of rotation of the drill spindle but also if so desired, to change the rate at which the drill is fed into the work. The gearing system, when constructed in accordance with my invention, comprises two gear members which are respectively mounted on a driving and a driven member.

Each gear member is preferably provided with two circular rows of gear teeth having the same circular pitch. The pitch diameter of each row of teeth on each member is different from the diameters of the pitch circles of the other rows of teeth on the two gear members. However, a diameter of the pitch circle on one member plus the diameter of one of the pitch circles on the other gear member is equal to the diameters of the other two pitch circles on the two gear members. When the two gear members are constructed as above set forth, it is possible to obtain one change in speed of rotation of the driven member by merely reversing the position of the two gear members on the respective shafts. Moreover, two additional changes in speed of the driven member may be obtained by interchanging and reversing the positions of the two gear members. The interchanging of the two gear members gives one change in speed and the reversing of the positions of the gear members after they have been interchanged gives still another change in speed. Thus, it is possible to obtain four different speeds of a driven member by means of only two gear members. One change in speed is obtained by reversing the positions of the gear members and two additional changes in speed are obtained by interchanging the gear members.

It is apparent that a gearing system provided with transposition gears constructed as above set forth is much simpler in construction and is easy to operate to vary the speed of the driven member and accordingly the speed of rotation of the drill spindle. The driven member is connected to the drill spindle in any suitable manner. In the system disclosed in the application, the driven member which carries one of the transposition gear members is connected to the drill spindle by means of change gears which serve to effect still further changes in speed.

Other objects and advantages will be in part indicated in the following description and in part rendered apparent therefrom in connection with the annexed drawing.

Figure 2:
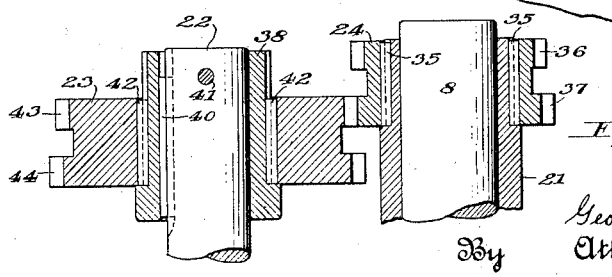

To enable others skilled in the art so fully to apprehend the underlying features hereof that they may embody the same in the various ways contemplated by this invention, a drawing depicting a preferred typical construction has been annexed as a part of this disclosure and, in such drawing, like characters of reference denote corresponding parts throughout all the views of which:

Figure 1 is a partial elevational view of an upright drilling machine having a gearing system constructed in accordance with my invention. Fig. 2 is a sectional view of the transposition gear members shown in Fig. 1 of the drawing.

Referring to the drawing, an upright drilling machine is shown comprising a box column 1 having a motor 2 and a gear casing 3 mounted thereon. The gear casing 3 is secured to a bracket 4 on top of the box column 1 by means of bolts 5. The bracket 4 is secured to the top of the column in any suitable manner as by means of bolts 6. A bracket 7, which directly supports the motor 2, is secured to the bracket 4 in any suitable manner. The gear casing 3 contains a gearing system which operates a drill spindle 8 at various speeds as will hereinafter be set forth. The drill spindle 8 is carried by a sleeve 9 which in turn is carried by a drill head 10. The drill head 10 is adjustable along the box column 1 in any suitable manner. Preferably the head is secured to the box column in various positions by means of bolts 11.

The drill sleeve 9 is provided with a rack 12 which meshes with a pinion 13 on the drill head. The pinion 13 may be operated manually by means of a hand wheel 14 or may be operated automatically by means of a gearing system connected to the gearing contained in the casing 3. The gearing connection between the pinion 13 and the gearing within the casing 3 comprises a worm wheel 15, a worm member 16, bevel gears 17 and a splined shaft 18. The connection between the splined shaft 18 and the gearing within the casing 3 will be described later.

The motor 2 in the drilling machine illustrated in the drawing serves not only to rotate the drill spindle 8, but also under certain conditions to effect feeding movement of the sleeve 9 and accordingly of the drill spindle 8. The armature shaft of the motor is connected through a reversing mechanism 20 to a reversing sleeve 21. The reversing sleeve 21 is aligned with the drill spindle 8 and is relatively slidable and rotatable with respect to the drill spindle which projects through it. The reversing mechanism 20 is illustrated and claimed in the companion application of David C. Klausmeyer Serial #34,829, filed June 4, 1925 (case A-495) and accordingly a detail description of such mechanism in this application is deemed unnecessary. A back gear shaft 22 is supported in the casing 3 parallel to the drill spindle 8 and is connected at the upper end thereof to the reversing sleeve 21 by means of two transposition gear members 23 and 24. The lower end of the back gear shaft 22 is connected to a back gear sleeve 25 by means of a change gear system 26. The change gear system 26 is described and claimed in the above mentioned application of David C. Klausmeyer and accordingly a detailed description of such system is not given in this application. The back gear sleeve 25 is splined to the drill spindle 8 in order to rotate therewith while permitting relative axial movement of the spindle. Thus, it is apparent that the motor effects operation of the drill spindle through the reversing mechanism 20, the back gear sleeve 21, the transposition gears 23 and 24, the back gear shaft 22, the change gears 26, and the back gear sleeve 25. Four different speeds of the back gear shaft 22 with respect to the reversing sleeve 21 may be effected by means of the transposition gears 23 and 24. Moreover, changes in speed of the back gear sleeve 25 with respect to the back gear shaft 22 may be effected by means of the change gears 26.

The splined shaft 18, which effects feeding movement of the drill sleeve 9, is operated by means of a gear wheel 27 directly mounted on the drill spindle 8. The gear wheel 27 meshes with a gear wheel 28 on a short shaft 29. The short shaft 29 carries a pinion 30 which meshes with a gear wheel 31 which is splined to the shaft 18.

The gear member 24, which is mounted on the reversing sleeve 21, is connected to the sleeve by means of key members 35. The member 24 comprises two circular rows of gear teeth 36 and 37 which have the same circular pitch. The two rows of gear teeth 36 and 37, however, are formed with different numbers of teeth and accordingly have pitch circles of different diameters. The gear member 24 may be held against longitudinal movement on the reversing sleeve 21 in such manner that the position of the gear member on the sleeve may be reversed with ease.

The gear member 23 is directly mounted on a sleeve 38 which in turn is mounted on the back gear shaft 22. The sleeve 38 is shown connected to the back gear shaft by means of a key 40 and a pin 41. The gear member 23 is shown connected to the sleeve 38 by means of two keys 42. The internal diameter of the gear member 23 is the same as the internal diameter of the gear member 24 and the keys 35 are similar in size to the keys 42 in order that the two gear members may be interchanged to obtain certain changes in speed of the back gear shaft. Two circular rows of teeth 43 and 44 are formed on the gear member 23. The pitch of the teeth in the two rows 43 and 44 is the same as the pitch of the rows of teeth on the gear member 24. However, the diameters of the pitch circles of the rows of teeth on the two gear members 23 and 24 are different. Accordingly it is apparent each row of teeth on the two gear members has a different number of teeth.

To obtain one speed of rotation of the back gear shaft 22 and accordingly one speed of rotation of the drill spindle 8, the two gear members 24 and 23 are respectively mounted on the reversing sleeve 21 and the back gear shaft 22 with the row of teeth 37 on the gear member 24 meshing with the row of teeth 43 on the gear member 23. In order to obtain a second speed of rotation of the back gear shaft 22 and accordingly of the drill spindle, the position of the gear member 24 on the reversing sleeve 21 is reversed and the position of the gear member 23 on the sleeve 38 is reversed. In the reversed position of the two gear members 23 and 24, the row of teeth 36 on the gear member 24 meshes with the row of teeth 44 on gear member 23. In this regard, it will be noted the diameter of the pitch circle for the row of teeth 43 plus the diameter of the pitch circle for the row of teeth 37 is equal to the diameter of the pitch circle for the row of teeth 44 plus the diameter of the pitch circle of the row of teeth 36. In order to obtain two further speeds of rotation of the back gear shaft 22 and the drill spindle, the two gear members 23 and 24 are interchanged. One speed is obtained by merely interchanging the two gear members and another speed is obtained by reversing the position of the two gear members after they have been interchanged.

In the above manner the transposition gears comprising the gear members 23 and 24 serve to operate the drill at four different speeds. The reversing and interchanging of the two gear members is easily effected and moreover such gear members occupy very little room.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or eqivalents thereof, by Letters Patent of the United States:

1. In a gearing system, the combination comprising a driving shaft; a driven shaft operated by said driving shaft; and two gear members interchangeably and invertibly mounted on said shafts for connecting them together, each of said gear members being provided with two gears of unequal pitch diameters and each being adapted selectively to mesh with a complemental gear on the other gear member, whereby the driven shaft may be operated at four different speeds by selectively reversing and interchanging said two gear members.

2. A gearing system combining a driving shaft; a driven shaft, said shafts being provided with indentical gear receiving portions; a gear member providing a plurality of gears of different pitch diameters removably and interchangeably but non-rotatably mounted on each of said shafts, each of the gears on each member being complementary to a gear on the other member; and means for maintaining said gear members in predetermined offset relation on their respective shafts to mesh a gear of one member with its complementary gear on the other member and maintain the unused gears out of mesh.

3. In a gearing system, the combination comprising a driving shaft; a driven shaft operated by said driving shaft; and two gear members, each providing two gears of unequal size, removably keyed to the two shafts, the gears on one member being complemental to the gears on the other member and meshing together for connecting the two shafts, said gear members being selectively reversible and interchangeable on the two shafts for operating the driven shaft at four different speeds.

4. In a gearing system, the combination comprising a gear member having two rows of teeth of the same pitch formed thereon, said rows of teeth having pitch circles of different diameters; a second gear member having rows of teeth adapted to mesh with the teeth on said first mentioned gear-member; and a driving and a driven shaft respectively connected to said two gear members, said gear members being reversible on the two shafts for varying the speed of the driven shaft.

5. In a gearing system, the combination comprising a gear member having two rows of teeth having pitch circles of different diameters; a second gear member having rows of teeth adapted to mesh with the teeth on said first mentioned gear member, the complemental rows of teeth being arranged adjacent opposite ends of said gear members when in mesh; and a driving and a driven shaft respectively so connected to said two gear members that the non-driving gears are at opposite sides of the driving gears, said gear members being interchangeable on the two shafts for varying the speed of the driven member.

6. In a gearing system, the combination comprising a driving shaft; a driven shaft operated by said driving shaft; and two gear members respectively mounted on said shafts and each having two circular rows of teeth different in number but of the same circular pitch for connecting the two shafts, said gear members being reversible to obtain one change of speed and being interchangeable to obtain two additional changes in speed between the two shafts.

7. In a gearing system, the combination comprising a gear member having two unequal circular rows of teeth formed thereon, and a second gear member provided with two circular rows of teeth complemental to the teeth on said first member, said gear members being mounted on two different centers and reversible for meshing different rows of teeth on them to vary the speed of one member with respect to the other member.

8. In a gearing system, the combination comprising a gear member having a plurality of circular rows of teeth of unequal pitch diameters formed thereon; and a second gear member provided with a plurality of circular rows of teeth having the same circular pitch as the rows of teeth on the first mentioned gear member, said gear members being mounted on two different centers and being reversible and interchangeable for selectively moving the different rows of teeth on the members into mesh with each other to vary the speed of rotation of one member with respect to the speed of the other member.

9. In a gearing system, the combination comprising a driving shaft; a driven shaft operated by said driving shaft; a gear member mounted on said driving member and having two circular rows of gear teeth, the diameters of the pitch circles for the two rows of teeth being different but the circular pitch for the teeth in the two rows being the same; and a gear member mounted on said driven member and having two circular rows of gear teeth, the diameters of the pitch circles for the two rows being different from each other and from the diameters of the pitch circles on the first mentioned gear member and the diameter of the pitch circle on one member plus the diameter of the pitch circle of a tooth row on the other member being equal to the sum of the diameters of the other two pitch circles.

In witness whereof, I have hereunto subscribed my name.

GEORGE E. MERRYWEATHER.